US011890778B1

(12) United States Patent
Holt

(10) Patent No.: US 11,890,778 B1
(45) Date of Patent: Feb. 6, 2024

(54) IMPLEMENT FOR WOOD CHIPPER

(71) Applicant: Steve Holt, Simi Valley, CA (US)

(72) Inventor: Steve Holt, Simi Valley, CA (US)

( * ) Notice: Subject to any disclaimer, the term of this patent is extended or adjusted under 35 U.S.C. 154(b) by 128 days.

(21) Appl. No.: 17/718,448

(22) Filed: Apr. 12, 2022

(51) Int. Cl.
*B25B 27/00* (2006.01)
*B27L 11/00* (2006.01)

(52) U.S. Cl.
CPC .................................. *B27L 11/005* (2013.01)

(58) Field of Classification Search
CPC .......... B25B 27/00; B25B 27/14; B66F 15/00
See application file for complete search history.

(56) References Cited

U.S. PATENT DOCUMENTS

| | | | | |
|---|---|---|---|---|
| 1,309,734 | A * | 7/1919 | Hemfling, Sr. | B66F 15/00 D8/89 |
| 7,690,627 | B2 * | 4/2010 | Harpell | B25C 11/00 254/21 |
| D754,499 | S * | 4/2016 | Blood | D8/14 |
| D780,542 | S * | 3/2017 | Rojas | D8/10 |
| 10,251,501 | B2 * | 4/2019 | Capobianco | A47G 23/02 |
| 10,344,488 | B2 * | 7/2019 | Bridges | B25G 3/08 |
| 10,882,725 | B2 * | 1/2021 | Plunkett | B66F 15/00 |

* cited by examiner

*Primary Examiner* — Lee D Wilson
(74) *Attorney, Agent, or Firm* — Sandy Lipkin

(57) ABSTRACT

An implement that is a tool made entirely of wood used for pushing debris into the feeder of a wood chipper. The implement includes a handle long enough for the safe operation by an average sized human that is attached to a head. The head includes a flat paddle that is shaped to conform to the dimensions of the feeder of a wood chipper. The flat paddle has a bottom portion, a top portion and side portions. The top portion attaches to the handle. The bottom portion is what is fed into the feeder. The bottom portion includes a brush bar that extends outward from the flat portion perpendicularly in both directions. Two additional side brush bars are attached to each side of the flat paddle and likewise extend outwardly perpendicularly in both directions. The handle and brush bars can be attached with dado joints and wood glue or can be formed integrally without the need for the dado joints.

12 Claims, 3 Drawing Sheets

IMPLEMENT FOR WOOD CHIPPER

BACKGROUND OF THE INVENTION

Field of the Invention

The field of this invention relates generally to the field of tree trimming and more particularly toward a device to help safely feed trimmed or removed wood from trees into a commercial wood chipper.

Description of the Prior Art

It is often the case that a tree needs to be trimmed or removed entirely. Furthermore, there are other situations wherein large branches and parts of trees need to be disposed of. In order for this to occur, the piece of the tree is cut into small enough portions that can be placed into a wood chipper to be broken down into smaller wood chips which can then be disposed of more easily and/or used as mulch. Wood chippers exist on a small, residential scale as well as on a commercial scale. The instant invention is intended primarily for commercial wood chippers, but there is nothing about the instant invention that would not work with small, residential wood chippers as it is a matter of scale.

Wood chippers are mechanical devices that use high speed blades and motors to break down the tough wood into smaller chips. Wood chippers have a feeding mechanism into which the tree parts are placed. These branches are placed into the feeder by humans and as a result, there is a safety issue ever present.

Presently, no real tools exist to feed wood into a commercial wood chipper safely. Workers are known to use unsafe methods to push debris into the wood chippers, such as metal shovels, rakes and brooms with metal frames. If any of these were to pass through the wood chipper, the metal found on those implements would likely ricochet off the chippers in feed rollers and hit the worker causing grave injury or death.

It is the object of the instant invention to provide an implement that allows a person to safely feed wood into a wood chipper using an all wood implement that is specifically designed to minimize potential blow black hazards from putting debris in a wood chipper.

SUMMARY OF THE INVENTION

The basic embodiment of the present invention teaches an implement for safely pushing debris into the feeder of a wood chipper comprising: a handle; a head attached to said handle, said head further comprising: a flat paddle with a top side, a bottom side, a first side and a second side, said top side being the attachment to said handle; a first brush bar attached to said bottom side of said flat paddle; a second brush bar attached to said first side of said flat paddle; and a third brush bar attached to said second side of said flat paddle.

The above embodiment can be further modified by defining that said implement is made entirely of wood.

The above embodiment can be further modified by defining that said handle attaches to said head with a dado joint and wood glue.

The above embodiment can be further modified by defining that said first brush bar is attached substantially perpendicularly to said bottom said and extending outwardly from said flat paddle.

The above embodiment can be further modified by defining that said second and third brush bars are attached substantially perpendicularly to said first and second sides of said flat paddle and extend outwardly from said flat paddle.

The above embodiment can be further modified by defining that said first brush bar is attached to said flat paddle using a dado joint and wood glue.

The above embodiment can be further modified by defining that said second and third brush bars are attached to said flat paddle using a dado joint and wood glue.

The above embodiment can be further modified by defining that said flat paddle is shaped to conform to the dimensions of a feeder of a wood chipper.

An alternative embodiment of the instant invention teaches a method for safely feeding debris into the feeder of a wood chipper comprising the steps of: acquiring debris to be fed into a wood chipper with a feeder; acquiring a wood chipper with a feeder; acquiring an implement for feeding said debris into said feeder of said wood chipper, said implement further comprising: a handle; a head attached to said handle, said head further comprising: a flat paddle with a top side, a bottom side, a first side and a second side, said top side being the attachment to said handle; a first brush bar attached to said bottom side of said flat paddle; a second brush bar attached to said first side of said flat paddle; and a third brush bar attached to said second side of said flat paddle; gripping said handle of said implement; placing said flat paddle into said feeder of said wood chipper with said bottom side entering said feeder of said wood chipper first; and pushing said debris through said feeder into said wood chipper by pushing said handle of said implement.

The above embodiment can be further modified by defining that said implement is made entirely of wood.

The above embodiment can be further modified by defining that said handle attaches to said head with a dado joint and wood glue.

The above embodiment can be further modified by defining that said first brush bar is attached substantially perpendicularly to said bottom said and extending outwardly from said flat paddle.

The above embodiment can be further modified by defining that said second and third brush bars are attached substantially perpendicularly to said first and second sides of said flat paddle and extend outwardly from said flat paddle.

The above embodiment can be further modified by defining that said first brush bar is attached to said flat paddle using a dado joint and wood glue.

The above embodiment can be further modified by defining that said second and third brush bars are attached to said flat paddle using a dado joint and wood glue.

The above embodiment can be further modified by defining that said flat paddle is shaped to conform to the dimensions of a feeder of a wood chipper.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
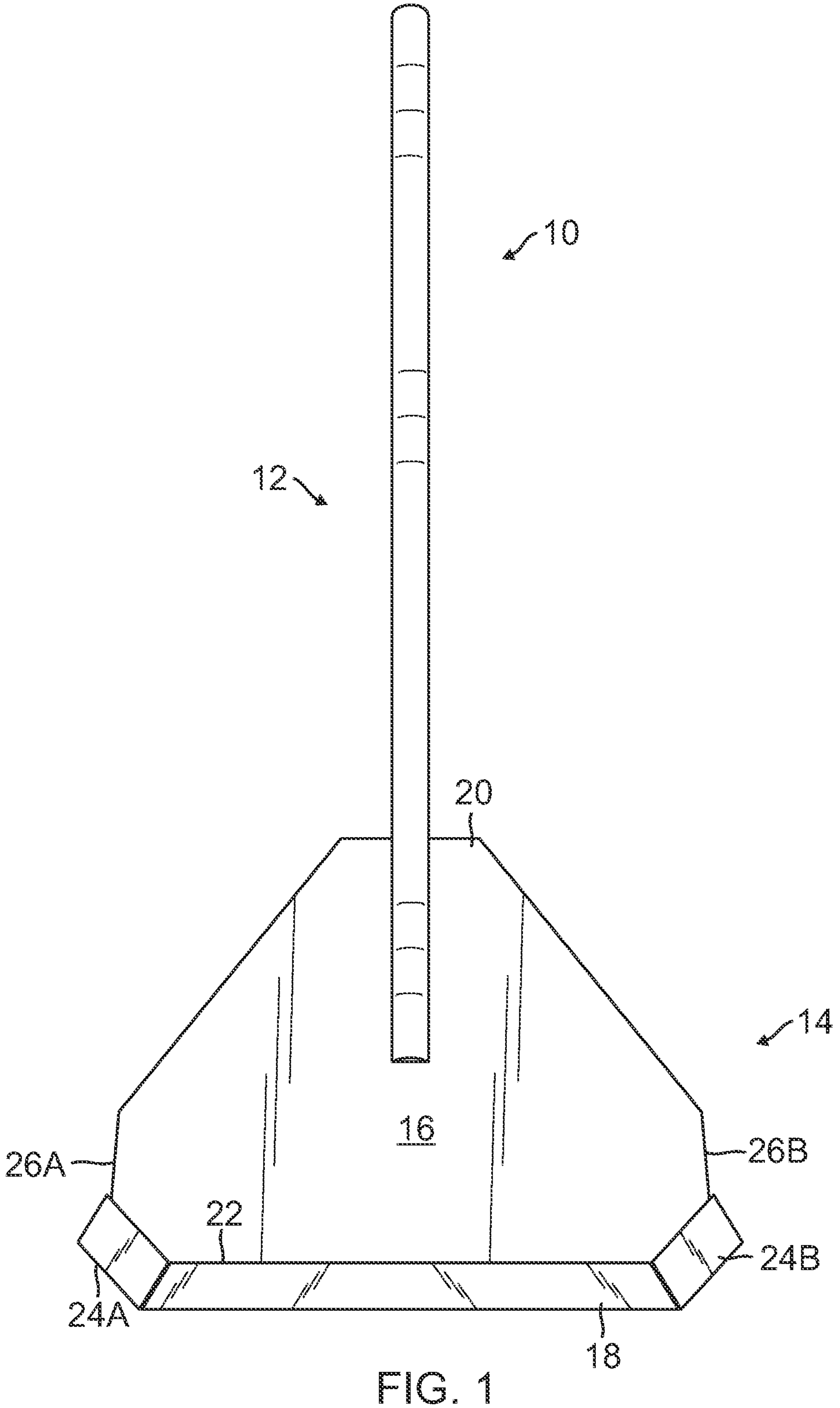
FIG. 1 is a front view of the implement for a wood chipper of the instant invention.
Figure 2:
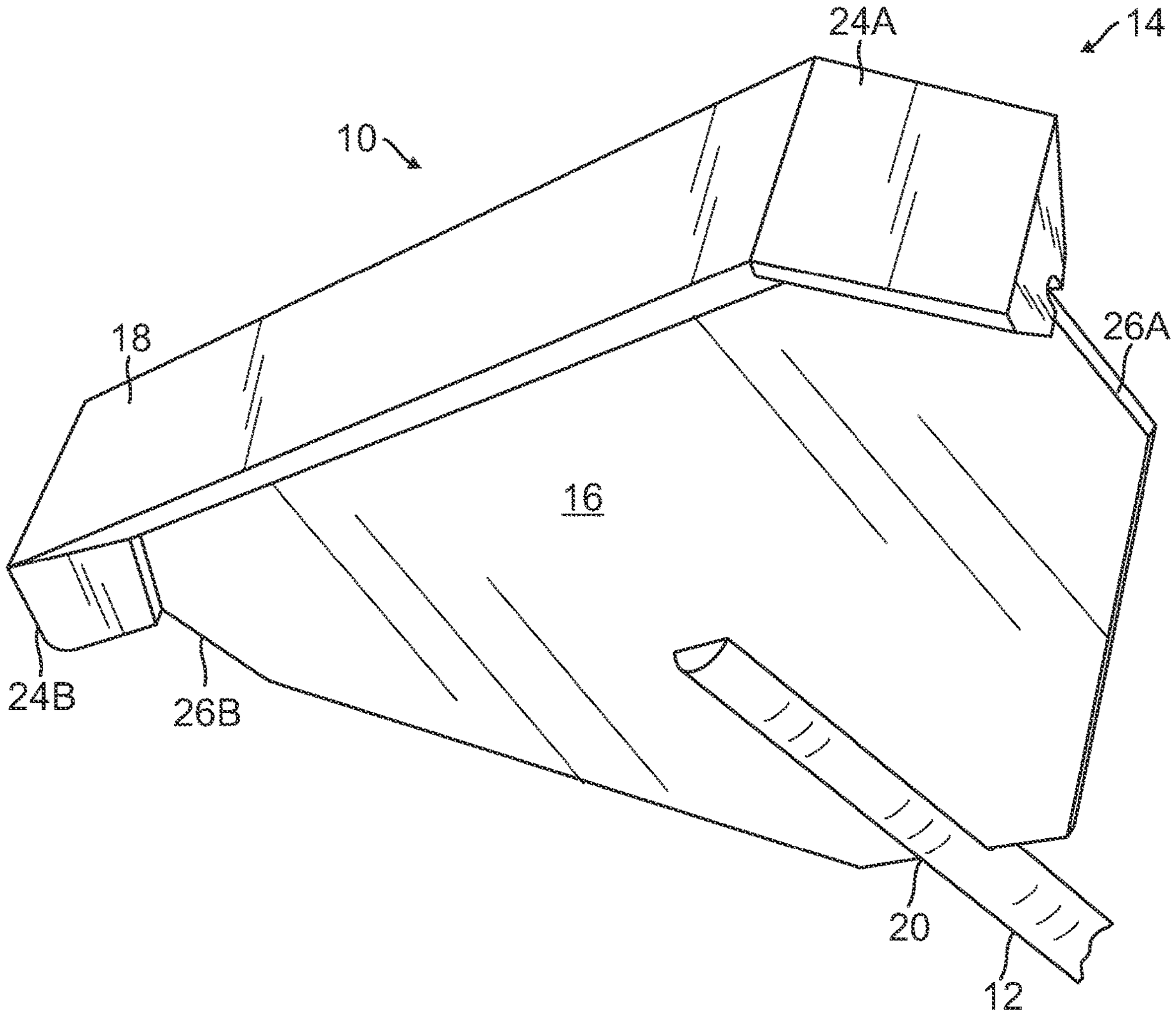
FIG. 2 is a bottom perspective view of the head of the implement for a wood chipper of the instant invention.
Figure 3:
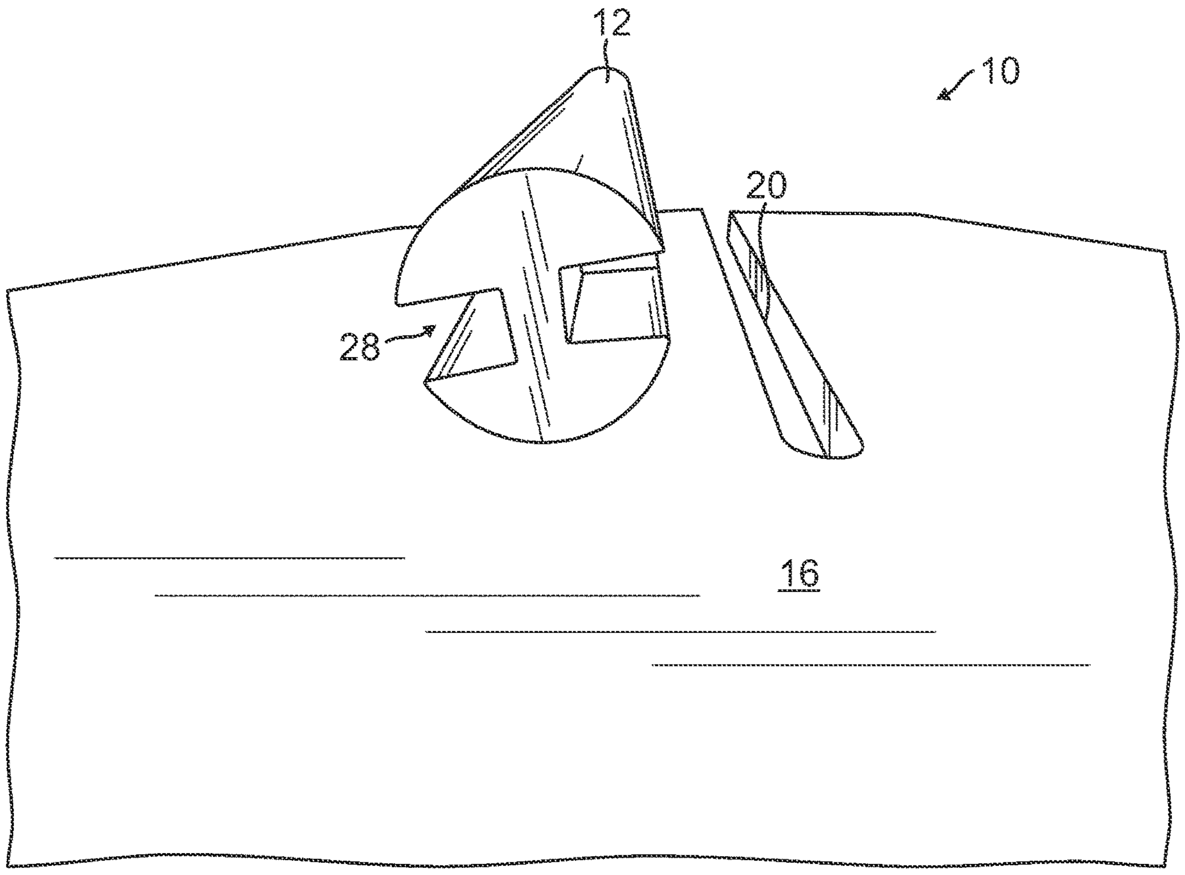
FIG. 3 is a top view of the handle and paddle of the instant invention, separated revealing the dado joint.

Turning to the drawings, the preferred embodiment is illustrated and described by reference characters that denote similar elements throughout the several views of the instant invention.

The preferred embodiment of the instant invention provides for a device 10 to be used as an implement to push debris (not shown) through the feeder (not shown) of a wood chipper (not shown). The implement 10 is essentially a push paddle with a handle 12 with a head 14 attached to it that workers (not shown) can use to push debris into a wood chipper. It is made entirely of wood and has a large flat paddle 16 and brush bar 18 that allows for the safe pushing of debris into a wood chipper. If the paddle 10 itself were to get caught into the machinery of the wood chipper, it would safely pass through like any other tree branch.

The paddle 10 includes a long wooden handle 12 that is about 4 feet in length to accommodate the height of the average user. At the end of the wooden handle 12 is a head 14 with a slot 20 with a dado joint 28 into which the handle 12 attaches to the wooden paddle 16 of the head 14, which is made of ½ inch plywood that is shaped to conform to the feeder geometry of the wood chipper. A brush bar 18 is found along the edge 22 of the paddle 16 distal from the slot 20 into which the handle 12 is seated, i.e., the end 22 that enters the feeder first. Two other side brush bars 24A, 24B are also included that extend up a distance of each side 26A, 26B of the push paddle 16.

The handle 12 is attached to the head 14 into the slot 20 with a double dado joint 28 and wood glue. Likewise, the paddle 16 and the three brush bars 18, 24A, 24B are connected through dado joints and wood glue. The four-foot wooden handle 12 has an 8-inch double dado joint 28 at one end and is assembled to the ½ inch plywood paddle 16 using a dado joint 28 and wood glue into the area identified in the figures and above as the slot 20. The brush bar 18 is routed with a ½ inch dado joint down the middle. The dado joint allows for the ½ inch plywood of the brush bar 18 to interlock and adhere with wood glue. The side brush bars 24A, 24B are inter-reversible and can go on either side. The side brush bars 24A, 24B interlock to the sides 26A, 26B of the wood paddle 16 using a dado joint and are adhered to the wooden paddle 16 and center brush bar 18 using wood glue.

To operate, the operator holds the handle 12 of the device 10 and pushes the debris into the feeder on the wood chipper with the paddle 16, leaving a safe distance and providing no metal to be introduced near the feeder of the wood chipper during the operation. Additionally, the operator may use the end of the push paddle 16 with its brush bars 18, 24A, 24B to directly push leaves into the machine straight on or off to the side.

In addition to the dado joint, the paddle 16 could be manufactured to be directly attached to the handle at the area identified in the figures and above as the slot 20. The entire apparatus is designed as a single integral, wholly wooden implement that can safely be used with a wood chipper.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An implement for safely pushing debris into the feeder of a wood chipper comprising:
- a handle;
- a head attached to said handle, said head further comprising:
  - a front planar plate with side plates attached to a bottom rectangular plate, said bottom rectangular plate being perpendicularly centered in between the front and side plates, said front plate being connected to said handle with a dado connection.

2. The implement as defined in claim 1 wherein said implement is made entirely of wood.

3. The implement as defined in claim 1 wherein said side plates are angled away from said handle with tapered angular sides being perpendicularly centered in between said front and side plates.

4. The implement as defined in claim 1 wherein said implement is made of metal.

5. The implement as defined in claim 1 wherein said implement is made of plastic.

6. The implement as defined in claim 1 wherein said flat paddle is shaped to conform to an opening of a feeder of a wood chipper.

7. A method for safely feeding debris into the feeder of a wood chipper comprising the steps of:
- acquiring debris to be fed into a wood chipper with a feeder;
- acquiring a wood chipper with a feeder;
- acquiring an implement for feeding said debris into said feeder of said wood chipper, said implement further comprising:
  - a handle;
  - a head attached to said handle, said head further comprising:

a front planar plate with side plates attached to a bottom rectangular plate, said bottom rectangular plate being perpendicularly centered in between the front and side plates, said front plate being connected to said handle with a dado connection;

gripping said handle of said implement;

placing said front planar plate into said feeder of said wood chipper with said bottom side entering said feeder of said wood chipper first; and pushing said debris through said feeder into said wood chipper by pushing said handle of said implement.

8. The method as defined in claim 7 wherein said implement is made entirely of wood.

9. The method as defined in claim 7 wherein said side plates are angled away from said handle with tapered angular sides being perpendicularly centered in between said front and side plates.

10. The method as defined in claim 7 wherein said implement is made of metal.

11. The method as defined in claim 7 wherein said implement is made of plastic.

12. The method as defined in claim 7 wherein said flat paddle is shaped to conform to an opening of a feeder of a wood chipper.

* * * * *